United States Patent
Cumming et al.

(10) Patent No.: US 11,650,161 B2
(45) Date of Patent: May 16, 2023

(54) METABOLITE DETECTION APPARATUS AND CORRESPONDING DETECTION METHOD

(71) Applicant: THE UNIVERSITY COURT OF THE UNIVERSITY OF GLASGOW, Glasgow (GB)

(72) Inventors: David Robert Sime Cumming, Glasgow (GB); Chunxiao Hu, Glasgow (GB); Mohammed Al-Rawhani, Glasgow (GB); Boon Chong Cheah, Glasgow (GB)

(73) Assignee: The University Court of the University of Glasgow, Glasgow (GB)

( * ) Notice: Subject to any disclaimer, the term of this patent is extended or adjusted under 35 U.S.C. 154(b) by 704 days.

(21) Appl. No.: 16/616,765

(22) PCT Filed: May 23, 2018

(86) PCT No.: PCT/EP2018/063525
§ 371 (c)(1),
(2) Date: Nov. 25, 2019

(87) PCT Pub. No.: WO2018/215553
PCT Pub. Date: Nov. 29, 2018

(65) Prior Publication Data
US 2020/0249175 A1 Aug. 6, 2020

(30) Foreign Application Priority Data
May 24, 2017 (GB) ...................................... 1708338

(51) Int. Cl.
*G01N 21/80* (2006.01)
*G01N 27/414* (2006.01)

(52) U.S. Cl.
CPC ......... *G01N 21/80* (2013.01); *G01N 27/4145* (2013.01); *G01N 2333/902* (2013.01); *G01N 2333/91215* (2013.01)

(58) Field of Classification Search
None
See application file for complete search history.

(56) References Cited

U.S. PATENT DOCUMENTS

| | | | |
|---|---|---|---|
| 2013/0098780 A1 | 4/2013 | Georgiou et al. | |
| 2013/0217054 A1 | 8/2013 | Huffstodt et al. | |

(Continued)

FOREIGN PATENT DOCUMENTS

| | | |
|---|---|---|
| CN | 105543071 A | 5/2016 |
| GB | 2477506 A | 8/2011 |

(Continued)

OTHER PUBLICATIONS

Wavelength Electronics white paper, "Photodiode Basics: Selective & Operation", Application Note AN-LD17 Rev A, 4 pgs, (Jan. 2020).*

(Continued)

*Primary Examiner* — J. Christopher Ball
(74) *Attorney, Agent, or Firm* — Troutman Pepper Hamilton Sanders LLP

(57) ABSTRACT

A CMOS-based chip having multiple sensing modalities that are able independently to detect multiple metabolites present in a sample. In particular, the chip provides multiple sensing modalities capable of performing detection within the same physical test volume, i.e. the chip can simultaneously detect a plurality of chemical reactions occurring in the test volume, where each chemical reaction yields a result that is independently detectable. The chip may comprise an optical sensor (e.g. photodiode) and a chemical sensor (e.g. pH sensor, embodied as an ISFET). With this technique, mul- (Continued)

tiple metabolites may be measured in real time using a small scale point-of-care device.

18 Claims, 6 Drawing Sheets

(56) References Cited

U.S. PATENT DOCUMENTS

| | | |
|---|---|---|
| 2016/0041155 A1 | 2/2016 | Takulapalli |
| 2016/0281149 A1 | 9/2016 | Hassibi et al. |
| 2017/0101666 A1 | 8/2017 | Hassibi et al. |

FOREIGN PATENT DOCUMENTS

| | | |
|---|---|---|
| WO | 2013/096817 A2 | 6/2013 |
| WO | 2014/146020 A2 | 9/2014 |
| WO | 2018/034982 A1 | 2/2018 |

OTHER PUBLICATIONS

Patents Act 1977: Search Report under Section 17(5) issued in corresponding United Kingdom Application No. GB 1708338.7 dated Nov. 14, 2017.

International Search Report and Written Opinion issued in corresponding International Application No. PCT/EP2018/063525 dated Aug. 3, 2018.

Cheah, B. C., et al. "An Integrated Circuit for Chip-Based Analysis of Enzyme Kinetics and Metabolite Quantification" IEEE Transactions on Biomedical Circuits and Systems 10(3):721-730 (labled as pp. 1-10 submitted with IDS) Nov. 15, 2016 cited as D4 in ISR and Written Opinion issued in Appln. No. PCT/EP2018/063525 dated Aug. 3, 2018.

Al-Rawhani, M. A., et al. "A Colorimetric CMOS-Based Platform for Rapid Total Serum Cholesterol Quantification" IEEE Sensors Journal 17(2):240-247 Jan. 15, 2017 cited as D5 in ISR and Written Opinion issued in Appln. No. PCT/EP2018/063525 dated Aug. 3, 2018.

Office Action dated Sep. 21, 2021 in Application No. CN 201880034281. 9; 18 pages.

Examination Report dated Sep. 20, 2021 in Application No. 18729599. 3; 8 pages.

Mross et al; Sensors and Actuators B: Chemical; v236; 2016; pp. 937-946.

\* cited by examiner

METABOLITE DETECTION APPARATUS AND CORRESPONDING DETECTION METHOD

This is a U.S. National Phase Application under 35 U.S.C. § 371 of International Patent Application No. PCT/EP2018/063525, filed May 23, 2018, which claims priority of United Kingdom Patent Application No. 1708338.7, filed May 24, 2017. The entire contents of which are hereby incorporated by reference.

FIELD OF THE INVENTION

The present invention relates to a process and apparatus for point-of-care real time metabolite sensing. In particular, the invention relates to an apparatus and process that enables multiple metabolites to be detected simultaneously from a single sample.

BACKGROUND TO THE INVENTION

Metabolism is a vital cellular process, and its malfunction can be a major contributor to many diseases. Metabolites (i.e. substances involved in metabolism) can be good indicators of disease phenotype, and can serve as a metabolic disease biomarkers. Therefore quantification and analysis of metabolites can play a significant role in the study and detection of many diseases.

A single metabolite can be a biomarker for several different diseases. However multiple metabolites together can serve as a biomarker for a particular disease. It is therefore often necessary to detect and quantify the presence of multiple metabolites in order to accurately identify a disease.

For example, elevated blood glucose could be the sign of hyperglycaemia or diabetes and may cause coronary heart disease. Serum cholesterol performs many essential duties in human body, such as serving as a precursor for the biosynthesis of steroid hormones, bile acid and vitamin D. Higher levels of blood cholesterol increase the risk of cardiovascular disease, particularly coronary heart disease. Both glucose and cholesterol have been well studied and proven to be independent risk factors for coronary heart disease. It has been shown that there is an adverse synergistic interaction of fasting glucose with total cholesterol that magnifies the risk of incident coronary heart disease events associated with total cholesterol for hypertensive patients. Therefore blood glucose and cholesterol may be studied as biomarkers for coronary heart disease.

A commonly used technique for detecting and quantifying metabolites is mass spectrometry (MS). This involves ionising a chemical species and sorting the product ions based on their mass-to-charge ratios. Separation methods such as gas chromatography and liquid chromatography are often required prior to performing a mass spectrometry measurement. Nuclear magnetic resonance (NMR) spectroscopy is another technique which is used for metabolite studies. NMR can be used to detect, identify and quantify a wide range of metabolites without having to first separate them. However, both of these techniques require bulky and expensive equipment, which confines their use to hospitals and laboratories.

More recently, use of a photodiode in a disposable sensing platform to measure colour changes of enzyme assay has been demonstrated as a means of detecting cholesterol [1]. The platform was based on a complementary metal oxide semiconductor (CMOS)-based photodiode array and an off-the-shelf light emitting diode (LED). The photodiode array is fabricated using commercial standard CMOS process, which is readily available for low-cost mass-production.

Photodiodes made in a CMOS process are generally sensitive to light in the 200 nm to 1100 nm range, owing to the bandgap of silicon (1.12 eV). This range makes them suitable for colorimetric enzyme assays that use visible light or fluorescent mediators, which often use wavelengths in the range 400 nm to 700 nm. A colour change in this range of enzyme assays, e.g. cholesterol ester hydrolase, cholesterol dehydrogenase, cholesterol esterase and cholesterol oxidase can be exploited to extract cholesterol levels.

In other recent work, another type of CMOS-based chip fabricated with an integrated ion-sensitive field effect transistor (ISFET) array was used to measure glucose concentration in blood through the activity of hexokinase. The action of the hexokinase on the glucose releases hydrogen ions that are detected by the ISFET [2].

SUMMARY OF THE INVENTION

At its most general, the present invention provides a CMOS-based chip having multiple sensing modalities that are able independently to detect multiple metabolites present in a sample.

In particular, the invention relates to a scenario in which detection by the multiple sensing modalities occurs in the same physical test volume, i.e. the chip can simultaneously detect a plurality of chemical reactions occurring in the test volume, where each chemical reaction yields a result that is independently detectable by one of the sensing modalities on the chip. With this technique, multiple metabolites may be measured in real time using a small scale point-of-care device.

According to one aspect of the invention, there is provided an apparatus for detecting metabolites in a biological sample, the apparatus comprising: a sample receiving module arranged to receive the biological sample and apply it to a test material whose properties are affected by the presence of metabolites to be detected; and a CMOS-based sensor unit having multiple sensing modalities, the sensor unit comprising a substrate having a first sensing element and a second sensing element fabricated thereon, wherein the first sensing element and the second sensing element are arranged to detect simultaneously different properties of the test material to enable simultaneous detection of a plurality of metabolites. The sample receiving module may support the test material in a reaction zone in which it is detectable by the sensor unit. The first sensing element and the second sensing element may be arranged to detect simultaneously different properties of the test material within a common volume of the reaction zone. The test material may be fixed or otherwise secured or held within the reaction zone ready to receive the biological sample. In one example, the test material may be a liquid solution arranged to support a plurality of metabolite-activated reactions upon receiving the biological sample.

One advantage of providing a chip-based sensor unit is that the multiple sensing modalities are provided at a scale that enables multiple properties of a single sample to be practically achievable. By probing different properties of the test material, the invention effectively provides a multiplexed measurement system, where separate signals corresponding to different metabolites can be obtained from the same device and test volume. This is particularly useful where the different properties of the test material detected by the sensor unit are independently affected by one or more metabolites to be detected, i.e. there is substantially no cross-talk between the signals.

Herein the phrase "CMOS-based" may mean that the device is capable of fabrication using conventional semiconductor chip processes, e.g. comprising a series of depositing, masking and etching steps on a substrate. The sensor unit and its constituent components may thus be semiconductor components. This may enable the sensor unit to be mass-produced at low cost. The apparatus may thus be embodied as a compact hand-held device which is easily transportable, thus facilitating rapid point-of-care diagnostics. Compared with current analytical methods for metabolite detection and quantification, no expensive detection equipment is required.

The sensor unit itself may resemble a semiconductor chip, and may have mounted thereon or connectable thereto means for controlling and processing the chip functions. For example, the apparatus may comprise a controller, e.g. a microprocessor or the like, arranged to send and receive signals from the sensor unit. For example, the controller may be arranged to activate the first sensing element and the second sensing element by applying an appropriate voltage.

The properties of the test material that are detected by the sensor unit may be physical or chemical. For example, the sensor unit may be arranged to detect changes in appearance, chemical composition, mass, temperature, etc. Each of the first sensing element and the second sensing element may be arranged to detect a single property.

In one example, the first sensing element comprises an optical sensor. The optical sensor may be arranged to detect changes in the appearance of the test material, e.g. by capturing an image or determining a change in optical properties thereof. The apparatus may comprise an optical source for illuminating the test material with optical radiation. In one example, the optical sensor may be a spectral absorption sensor, e.g. any of a single photodiode (PD), a single photon-avalanche diode (SPAD), a PD array, or a SPAD array. The type of optical sensor used may depend on the intended application. For example, a photodiodes and SPADs typically have different dynamic ranges and sensitivities, and they may be selected for use in the sensor unit based on these properties. In one example both a PD and a SPAD may be provided on the same device. They may be selectively operable based on a current test scenario.

The second sensing element detects a different property from the first sensing element. For example, the second sensing element may be a chemical sensor, e.g. arranged to determine a change in composition or chemistry within the test material. In one example, the second sensing element is a pH sensor, e.g. comprising an ion sensitive field effect transistor (ISFET) having a gate electrode in contact with the test material. The apparatus may include a reference electrode arranged to apply a voltage to the test material.

The features described above may be combined. Thus, in one particular embodiment, the invention may provide a metabolite detection device which enables the simultaneous detection of two metabolites in a sample of blood serum. The device includes a sample container for holding a test solution and a sensor unit, the sensor unit having a pH sensor arranged to detect a change in pH in the test solution caused by a first metabolite-enzyme reaction in the test solution, and a spectral absorption detector arranged to detect a change in absorption of the test solution caused by a second metabolite-enzyme reaction in the test solution. The change in pH is associated with the presence of a first metabolite in the test solution and so can be used to determine the amount of first metabolite present in the test solution at the start of the first metabolite-enzyme reaction. Similarly, the change in absorption of the test solution can be used to determine the amount of a second metabolite present in the test solution at the start of the second metabolite-enzyme reaction. A change in absorption of the test solution may be caused by a change in colour of the test solution arising from the second metabolite-enzyme reaction. The two metabolite-enzyme reactions may occur simultaneously in the test solution, enabling simultaneous detection of the two metabolites.

In the above example, the biological sample is blood serum, but the invention can be used with any biological sample capable of communicating metabolites into the reaction zone.

The test solution or liquid solution discussed above may comprise a plurality of enzymes in a buffer solution. The buffer solution may include a mixture of chemicals which are required for the simultaneous first and second metabolite-enzyme reactions. The buffer solution may include the relevant enzymes for the reactions, as well as a pH regulator to ensure that the pH of the solution remains within a range in which the enzymes are effective. The buffer solution may also include chemicals which react with products of one of the metabolite-enzyme reactions in order to produce a change in absorption of the test solution (e.g. a colour change).

The sample container may be pre-loaded with the buffer solution. The sample of blood serum is then placed in the sample container, causing the blood serum and buffer solution to mix and form the test solution. If one or both of the metabolites which are being tested for are present in the blood serum, the corresponding metabolite-enzyme reactions will occur, causing a change in pH and/or absorption of the test solution in the sample container.

The pH sensor may be an electrochemical sensor capable of converting a change in pH in the test solution into an electrical signal. The pH sensor may be sensitive to hydrogen and/or hydroxyl ion species produced in a metabolite-enzyme reaction. For example, the pH sensor may be an ion-sensitive field-effect transistor (ISFET). An ISFET is a field-effect transistor (FET) in which a test solution is used as the gate electrode. A change in pH (i.e. a change in concentration of $H^+$) of the test solution causes a current running through the ISFET to change by a measurable amount.

The spectral absorption detector is capable of producing an electrical signal in response to a change in absorption of light transmitted by the test solution. The spectral absorption detector may be arranged to monitor absorption at a particular frequency, or over a range of frequencies. The metabolite detection device may include a light source (e.g. an LED) arranged to shine light through the test solution. A photodiode may then be included in the sensor unit, where the photodiode is arranged to receive light from the light source which has been transmitted by the test solution. The photodiode can produce an electrical signal in response to receiving light transmitted by the test solution, where the magnitude of the electrical signal depends on the intensity of transmitted light.

The apparatus may comprise an array of CMOS-based sensor units, wherein each CMOS-based sensor unit in the array comprises a respective first sensing element and a respective second sensing element. Respective signals can be measured from each sensor unit. Alternatively, an average signal can be measured from the array of sensor units. Measuring an average signal can greatly reduce signal noise: according to Gaussian statistics, signal noise is reduced as a function of $\sqrt{N}$, where N is the number of sensor units.

Each CMOS-based sensor unit in the array may be independently addressable to obtain signals from each respective first sensing element and respective second sensing element.

The apparatus may include further components for controlling or monitoring the reaction zone. For example, the apparatus may include a temperature regulating module for controlling a temperature of the test material.

In another aspect, the invention may provide a method of detecting metabolites in a biological sample, the method comprising: applying, in a reaction zone of a detection apparatus, the biological sample to a test material whose properties are affected by the presence of metabolites to be detected; simultaneously measuring different properties of the test material in the reaction zone using a CMOS-based sensor unit having multiple sensing modalities, the sensor unit comprising a substrate having a first sensing element and a second sensing element fabricated thereon; and determining the presence of a plurality of metabolites based on output signals from the first sensing element and the second sensing element.

The sensor unit may comprise any of the features discussed above. For example, the first sensing element may comprise an optical sensor, wherein the method includes illuminating the reaction zone with optical radiation, and wherein the output signal from the first sensing element is indicative of absorption of the optical radiation by the test material. The second sensing element may comprise a pH sensor, wherein the output signal from the second sensing element is indicative of a pH of the test material.

BRIEF DESCRIPTION OF THE DRAWINGS

An embodiment of the invention is described in detail below with reference to the accompanying drawings, in which.

DETAILED DESCRIPTION

Embodiments of the present invention provide a metabolite detection device in which multiple sensing modalities are provided by components fabricated on to a single CMOS-based chip. In the examples discussed below, the sensing modalities include an optical sensor, e.g. for sensing optical radiation, and a pH sensor, e.g. for sensing a concentration of ionic species in a sample. However, it may be understood that the principles of the invention are applicable to any kind of sensor that can be fabricated on a chip and which is capable of detecting information indicative of the presence of a metabolite.

The sample may be a biological sample (e.g. fluid or tissue) obtained from a subject in any conventional manner. In the example discussed below the sample is blood serum, but it should be understood that the invention may encompass the use of other (or additional) sample types.

Figure 1:
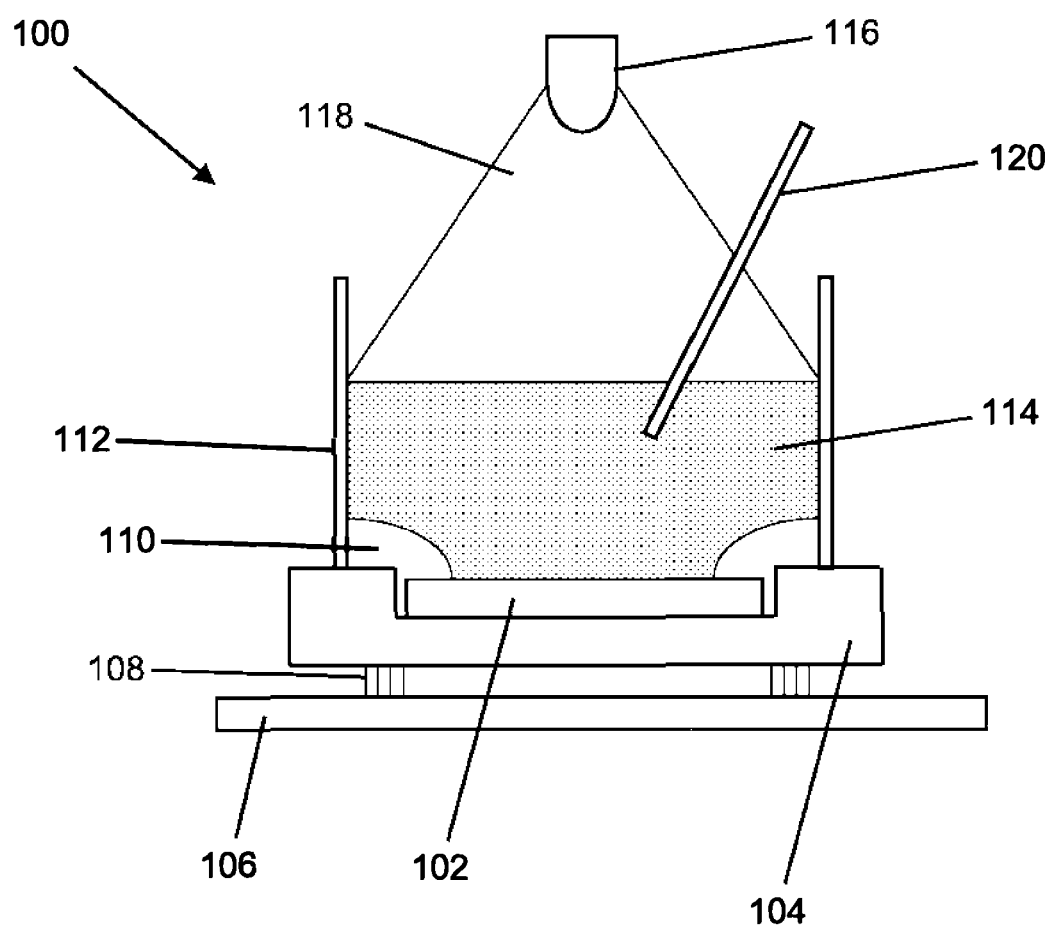
FIG. 1 is a schematic side view of a multi-modality metabolite detection device that is an embodiment of the invention.

FIG. 1 is a schematic illustration of a metabolite detection device 100 which is an embodiment of the invention. The metabolite detection device combines a pH sensor and an optical sensor within a single sensor unit, in order to enable simultaneous detection of two metabolites from a single sample.

The metabolite detection device 100 includes a chip 102 containing an array of sensor units. Each sensor unit includes a pH sensor and an optical sensor. The chip 102 is mounted in a chip carrier 104, which is itself connected to a printed circuit board (PCB) 106 via a set of pins 108. The chip 102 is wire bonded to bonding pads on the chip carrier 104 with fine gold wires. The bonding pads on the chip carrier 104 are electrically connected to the PCB 106 via the pins 108 so that electrical signals from the chip 102 can be measured. The chip 102 is secured to the chip carrier 104 with epoxy 110. The epoxy 110 covers outer edges of the chip 102 such that the fine gold wires are embedded in the epoxy 110. Epoxy may also be used on the underside of the chip 102 to secure it to the chip carrier 104. A central region of the chip 102 is left exposed so that it may come in contact with a test solution. This can be achieved, for example, by placing a protective mask over the central region of the chip when the epoxy 110 is being deposited and cured, and subsequently removing the mask.

A section of cylindrical tube 112 is secured to the chip carrier 104 to form a sample container above the surface of the chip 102. The chip 102 forms the bottom surface of the sample container, such that when a test solution 114 is placed in the sample container, the exposed central region of the chip 102 is in contact with the test solution 114. The metabolite detection device 100 also includes a light source 116 disposed above the sample container. The light source is arranged to shine light 118 onto the central region of the chip 102 through the test solution 114 held in the sample container. Changes in the light absorption properties of the test solution 114 can be detected by a photodiode on the chip 102. The light source 116 may for example be an LED, or other conventional source for emitting optical radiation. The light source 116 may emit light at a particular wavelength, or it may be a broadband light source.

The metabolite detection device 100 also includes a heater and temperature sensor (not shown) in order control the temperature of the chip 102 using a PID controller. The heater and temperature sensor may for example be mounted on the back of the chip carrier 104. This enables the test solution 114 to be maintained at a temperature at which enzymes contained in the test solution 114 remain effective (e.g. around 37° C.)

The metabolite detection device 100 also includes a reference electrode 120. The reference electrode 120 is arranged such that, when the sample container is holding a test solution 114, the tip of the reference electrode 120 is submerged in the test solution 114. The reference electrode 120 is connected to a voltage source (not shown) and is used to provide a liquid gate voltage for a pH sensor on the chip 102. The reference electrode 120 may be a conventional reference electrode used for electrochemical measurements, such as an Ag/AgCl electrode. Both the light source 116 and reference electrode may be integrated in a cap which is configured to fit over the cylindrical tube 112, in order to provide a sealed measurement environment.

In use, the metabolite detection device 100 may be mounted within a hand-held body, e.g. moulded casing or the like. The body may comprise a power source and a controller for operating the device 100, e.g. via a user interface mounted on the outside of the body. The controller may comprise a processor and memory, e.g. having instructions stored thereon that are executable to operate the device 100. The controller may include a communication interface for enabling the results of the detection process to be transferred to another device. In one example, the communication interface may include a USB port that allows the body to be communicatively connected to another computing device, e.g. a laptop or desktop computer.

Figure 6:
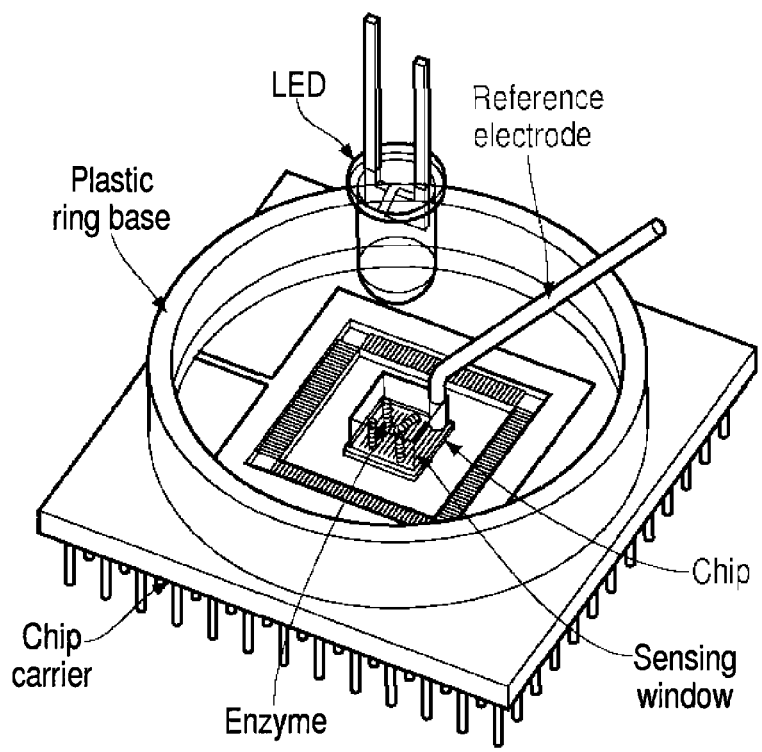
FIG. 6 is a schematic perspective view of a multi-modality metabolite detection device according to the invention in a measurement configuration.

FIG. 6 shows a schematic perspective view of the device discussed above in a measurement configuration.

Figure 2:
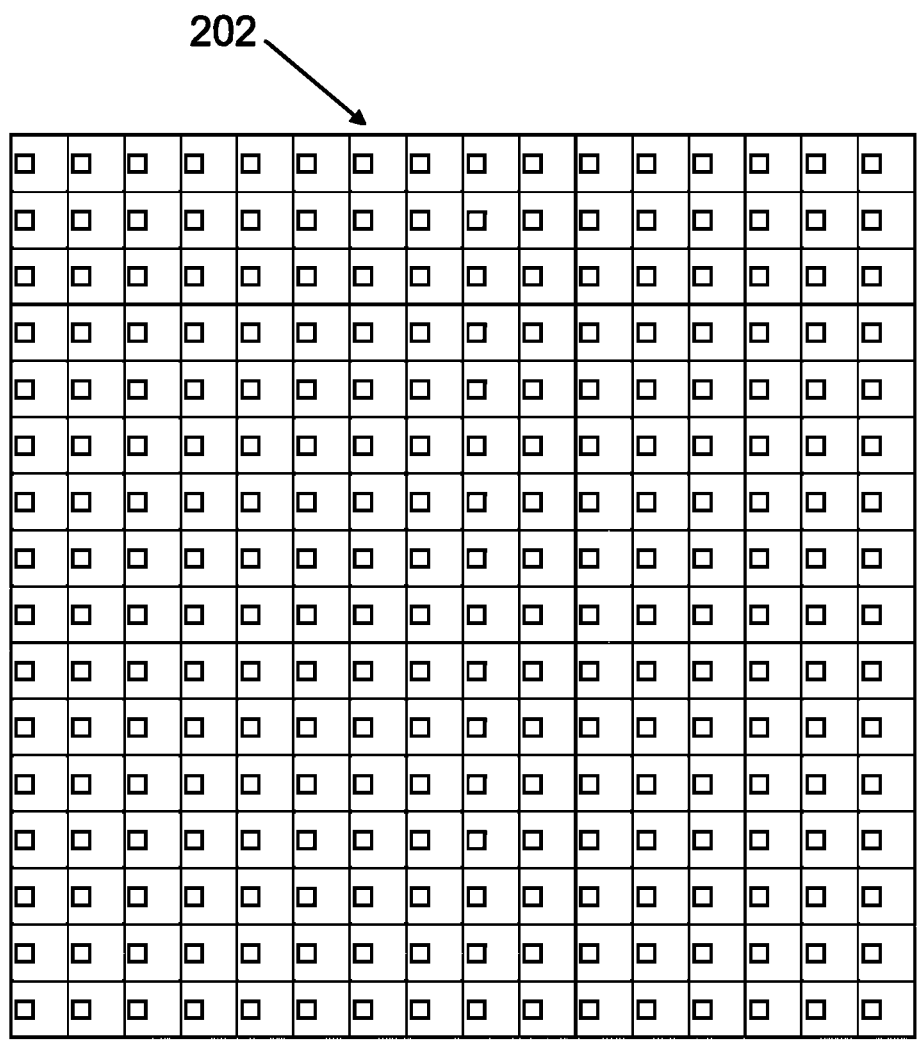
FIG. 2 is a schematic plan view of an array of sensor units that can be used in the detection device of FIG. 1.

FIG. 2 is a schematic diagram of an array 202 of 256 (i.e. 16×16) individual sensor units which is disposed in the exposed central region of chip 102. The chip 102 also includes addressing and readout circuits for obtaining signals from each individual sensor unit. A 16×16 array is shown merely as an example, other sizes of array are possible.

Figure 3:
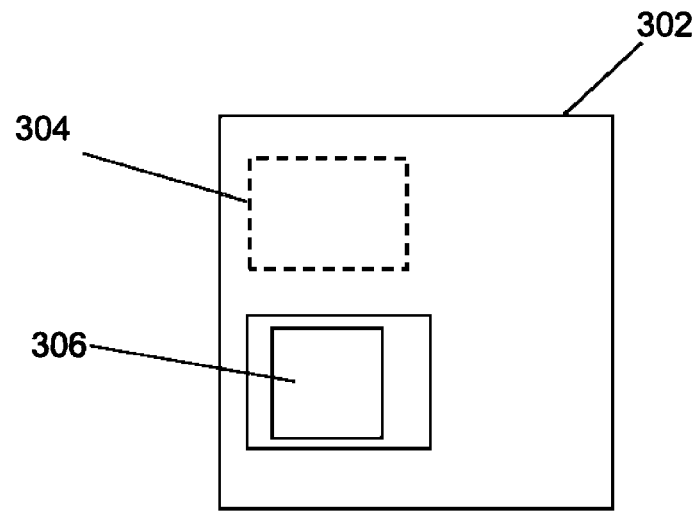
FIG. 3 is a schematic plan view of a single sensor unit from the array shown in FIG. 2.

FIG. 3 shows an enlarged view of a single sensor unit 302. Each sensor unit 302 includes a photodiode 304 and an ion sensitive field-effect transistor (ISFET) 306. The photodiode 304 is incorporated into an active pixel sensor design which incorporates the photodiode and three transistors to enable the readout of data. The photodiode may be a conventional p-n junction based photodiode. As shown in FIG. 3, there is space on the chip to permit integration of additional sensors, if required.

Figure 4:
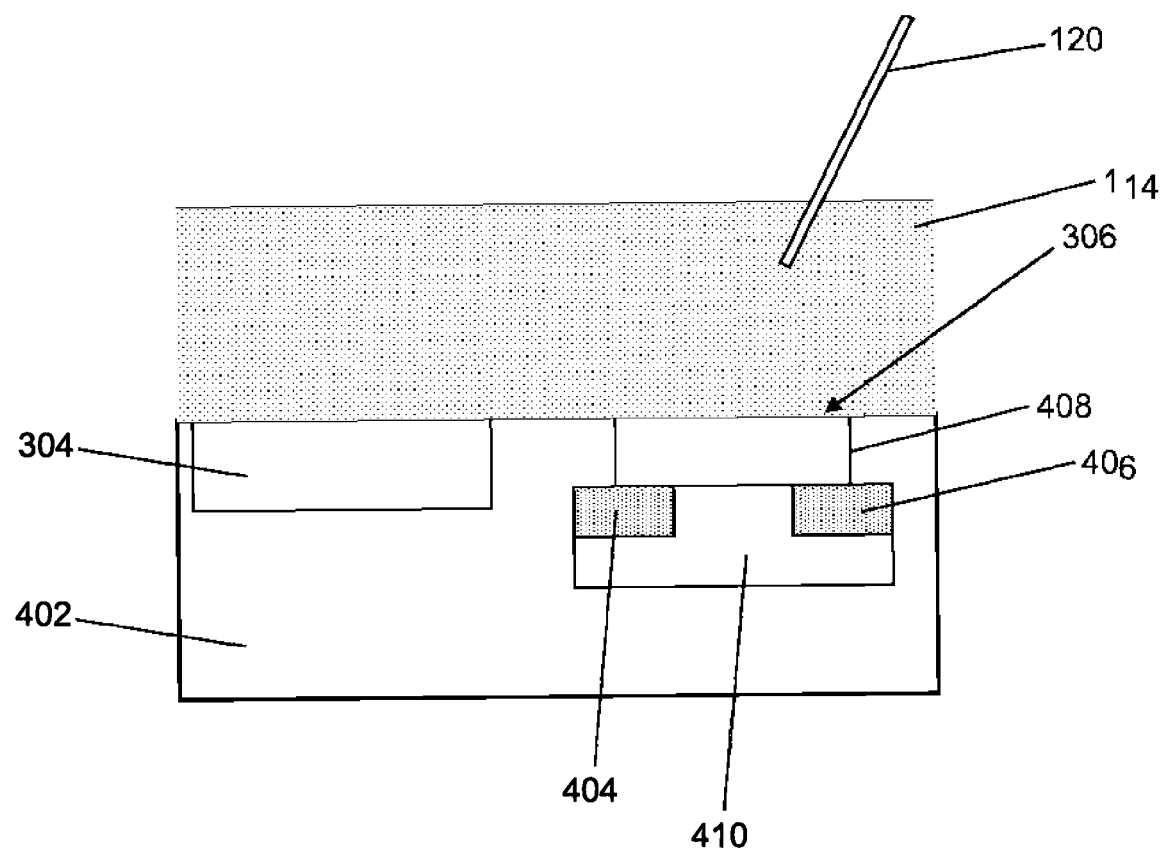
FIG. 4 is a schematic cross-sectional view through the sensor unit of FIG. 3.

FIG. 4 is a schematic cross-section of the sensor unit 302. The photodiode 304 and ISFET 306 of the sensor unit are embedded in a substrate 402 of the chip 102. An upper, light-sensitive surface of the photodiode 304 is exposed such that it may receive light from the light source 116. The ISFET 306 includes a source 404, a drain 406, a gate oxide layer 408 and a bulk layer 410. The ISFET 306 enables $H^+$ ions which are present in the solution 114 to be detected so that the pH of the test solution 114 can be measured. $H^+$ ions can adsorb onto surface of the oxide gate layer 408 which is exposed to the test solution 114. This attracts charge carriers in the bulk layer 410 to the surface of the bulk layer 410, causing a threshold voltage of the ISFET 306 to change. The reference electrode 120 (not drawn to scale in FIG. 4) is used to apply a gate voltage to the test solution 114. The change in threshold voltage can be measured by applying a constant gate voltage with the reference electrode, and measuring a change in current flowing between the source 404 and drain 406 caused by a change in concentration of $H^+$. Alternatively, a constant current can be run between the source 404 and the drain 406 and changes in the applied gate voltage can be measured.

Figure 5:
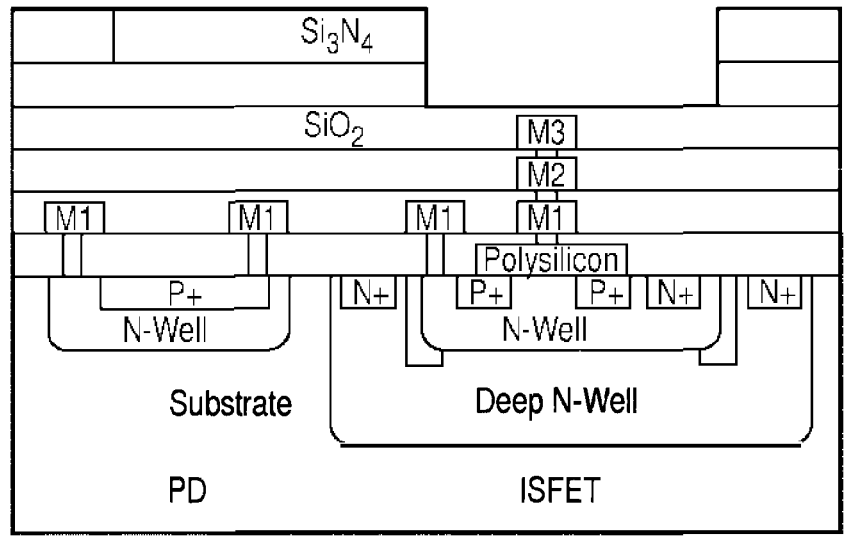
FIG. 5 is another schematic cross-sectional view through the sensor unit of FIG. 3.

FIG. 5 shows the cross-section view of FIG. 4 in more detail. The structure shown can be fabricated using a conventional 0.35 μm four-metal CMOS process. The metal layout for the ISFET structure in each pixel uses a metal-via stack to contact the underlying transistor to the top metal layer M3, which lies within a dielectric layer exposed to the test sample (analyte) through a window formed in a transparent $Si_3N_4$ passivation layer. The M3 layer therefore forms a capacitor with the analyte above the chip. The dielectric in contact with M3 acts as an ion sensing material which translates the hydrogen ion concentration in the analyte to a voltage at the polysilicon gate of the ISFET according to the Nernst equation. The dielectric material that is exposed to the sample may be a $SiO_2$ or $Si_3N_4$ passivation layer. Alternatively or additionally, another dielectric, such as $Ta_2O_5$, may be used. $Ta_2O_5$ has been shown to give a response as large as 58 mV/pH. The $Ta_2O_5$ is a thin insulator and therefore does not modify the cross-talk properties of the individual sensors that have previously been shown to be capable of forming images.

An intermediate metal layer M2 is used to enable the unit to be addressable. There may be two intermediate layers to enable each sensor unit (pixel) to be independently addressable.

Figure 7A:
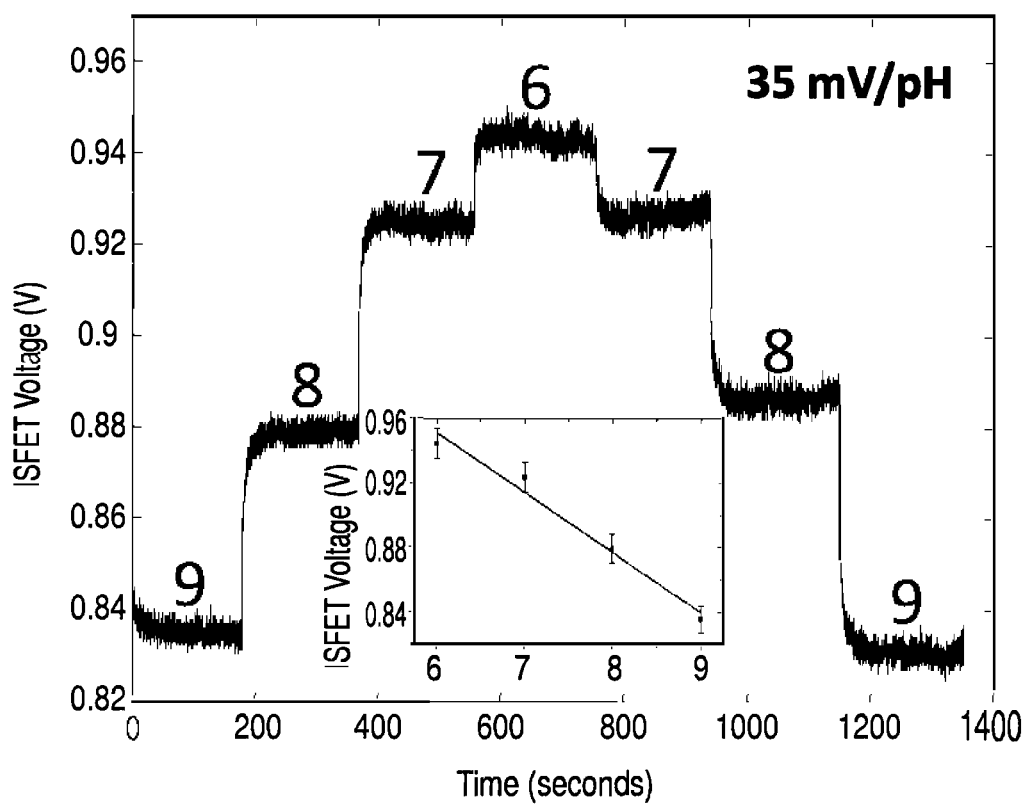
FIG. 7 is a pair of graphs showing characteristics of the ISFET and photodiode in the sensor unit of FIG. 5.

Prior to the actual simultaneous detection measurement with real analyte, the device is characterized. The pH sensitivity of the CMOS based ISFET and the responsiveness (to the colour change) of the photodiode are thus verified. In this example, the ISFET was characterized with a triethanolamine buffer (5 mM Triethanolamine HCl and 50 mM NaCl) that has the same salt concentration and buffering capacity as the actual measurement. Four different buffers with pH values 6, 7, 8 and 9 were made by adding 1M HCl or 1M NaOH. Prior to each measurement, the entire sensing well was incubated in 3% bovine serum albumin (BSA) in phosphate-buffered saline (PBS) to minimize nonspecific binding. After the chip being washed thoroughly with deionised water, 100 μl pH 9 buffer was firstly added to the sensing well to obtain a baseline signal. The buffer was then replaced by pH 8, 7, and 6 buffer sequentially, which covers the pH range can happen in actual measurements. FIG. 7(a) shows the variation in ISFET voltage during this process. The inset of this graph shows that the change of ISFET voltage is a linear function of pH with a slope of ~35 mV/pH, which is in line with literature values for $SiO_2$ surfaces.

Figure 7B:
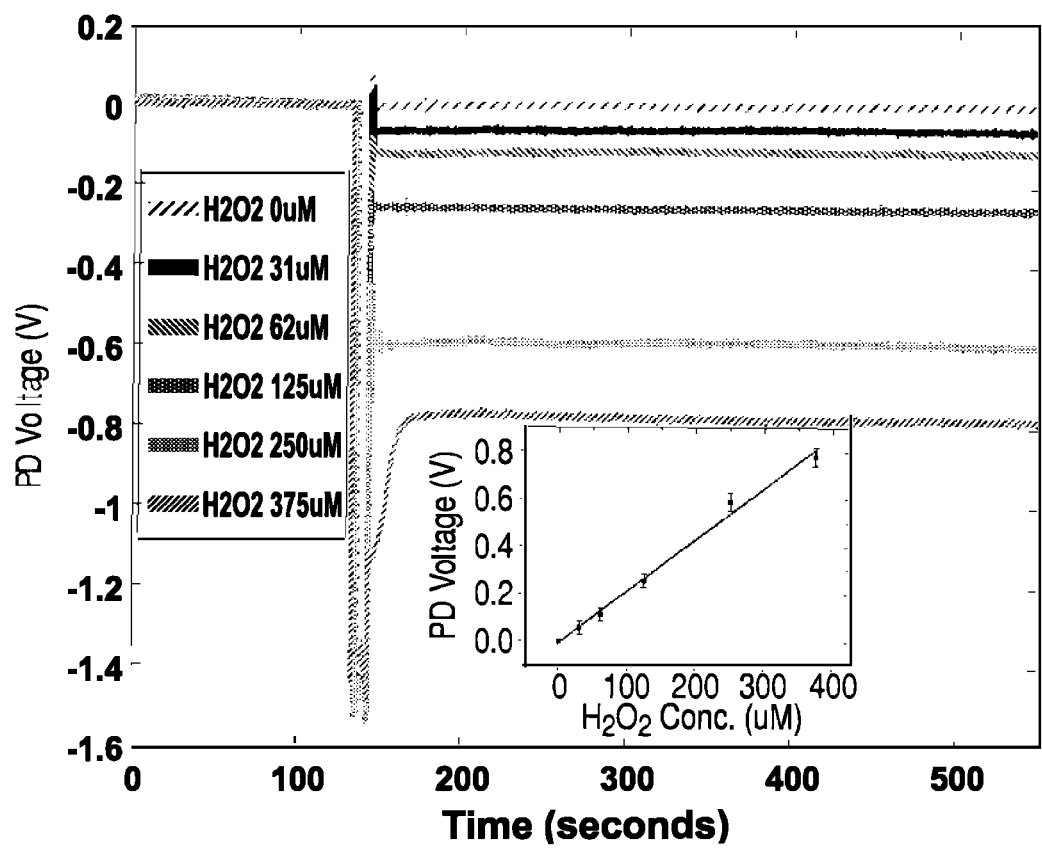

The photodiode was characterized with hydrogen peroxide ($H_2O_2$), which is a common product generated during the enzyme reaction. Five different concentration of $H_2O_2$ from 31 μM to 375 μM were measured. The $H_2O_2$ solution was prepared and diluted with triethanolamine buffer at pH 8. A mixed solution of O-Dianicidine (7.89 mM) and peroxidase (60 U/ml) was firstly added to the sensing well to get a baseline signal. $H_2O_2$ solution was then added to trigger the reaction and the colour change was then recorded by the photodiode. FIG. 7(b) is a graph showing photodiode voltage response for each of the $H_2O_2$ concentrations. The inset of this graph shows that the photodiode voltage is a linear function of $H_2O_2$ concentration (in the range from 31 μM to 375 μM).

Both the ISFET and the photodiode are therefore characterized and proven to be sensitive enough for the actual metabolite detection measurement.

Using the metabolite detection device 100, the presence of cholesterol and glucose in a sample of blood serum can be simultaneously detected and quantified. This measurement is based on two separate metabolite-enzyme reactions which take place concurrently in the sample container: cholesterol-cholesterol oxidase (equation (3), below) and glucose-hexokinase (equation (1), below). The cholesterol-cholesterol oxidase reaction produces $H_2O_2$, which reacts with o-dianisidine to form a product having an orange colour. This colour change can be detected based on the absorption of light by the test solution using the photodiode in the sensor unit. The glucose-hexokinase reaction produces $H^+$ ions which causes a decrease in pH of the test solution. This reaction can therefore be monitored using the ISFET. The measurement is performed by mixing a sample of blood serum with a buffer solution containing the necessary chemicals for the various metabolite-enzyme reactions, in order to form the test solution.

According to one embodiment of the invention, there are four reactions which are involved in the detection of glucose and cholesterol:

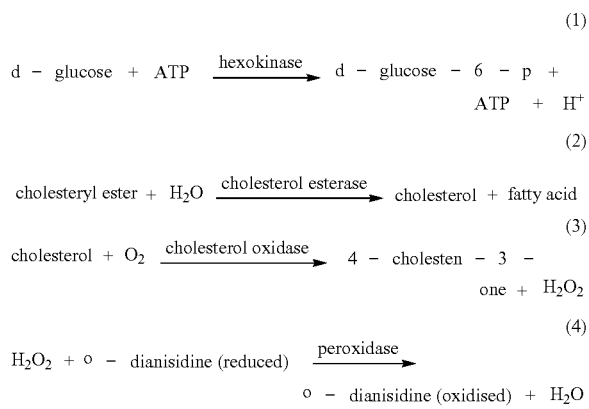

Equation (1) describes the glucose-hexokinase reaction. ATP stands for adenosine 5'-triphosphate and ADP stands for adenosine 5'-diphosphate. The total change in pH of the test solution caused by the production of H$^+$ during the reaction can be measured directly using the ISFET and used to determine the amount of glucose present in the blood serum sample at the beginning of the reaction.

Equations (2)-(4) describe the reactions required to detect and quantify the presence of cholesterol using the photodiode. Approximately 30% of cholesterol in blood serum is present in its "free" form (typically, 40 mg/dl-85 mg/dl) while the remainder is assimilated into cholesteryl esters with long-chain fatty acids. In the reaction described by equation (2), the enzyme cholesterol esterase is used to hydrolyse cholesterol esters to produce free cholesterol. This allows the total amount of cholesterol in the blood serum to be measured, by ensuring that all of the cholesterol is present in its "free" form. The second reaction, described by equation (3), involves the enzyme cholesterol oxidase, which is an oxidoreductase that uses molecular oxygen as an electron acceptor to reduce oxygen to hydrogen peroxide. Both the cholesterol which was initially present in the blood serum in its "free" form and the free cholesterol produced in reaction (2) participate in the cholesterol oxidase reaction. The third reaction, described by equation (4), involves the production of a coloured product to be measured optically. The third reaction is catalysed using the enzyme peroxidase. In the presence of H$_2$O$_2$ produced by the cholesterol oxidase reaction, o-dianisidine is oxidised to an orange-coloured product. This causes a change in colour of the test solution, which can be detected by measuring a change in absorption of the test solution. The change in absorption can in turn be used to estimate the total amount of cholesterol which was present in the blood serum. O-dianisidine is chosen because it is a pH independent redox indicator, and it is unaffected by the pH drop generated from the glucose-hexokinase reaction.

The photodiode and light source which are used to detect the change in absorption of the test solution may be chosen in order to provide an optimal response for a particular metabolite-enzyme reaction. This can be done by comparing the absorption spectrum of the product of the metabolite-enzyme reaction which causes the colour change with the responsivity (i.e. output voltage per unit of incident radiation) of the photodiode, in order to determine a region of overlap between the two. The light source may then be chosen such that it emits light at a wavelength in this region of overlap. Preferably the photodiode is chosen such that it has a peak in its responsivity near a peak in the absorption spectrum of the product of the metabolite-enzyme reaction. For the o-dianisidine-peroxidase dianisidine-peroxidase reaction (equation (4)), it was found that the absorption spectrum of a test solution containing oxidised o-dianisidine has a peak near 460 nm, whilst the photodiode used was found to have a peak responsivity near 600 nm. There was found to be a strong overlap between the absorption spectrum of oxidised o-dianisidine and the responsivity of the photodiode near 500 nm, such that a light source operating near 500 nm would provide an optimal response. For this reason, a green LED with a peak wavelength of 502 nm was chosen.

Measurement conditions such as temperature, pH and ionic strength are crucial for the stability and activity of enzyme reactions. It is therefore important that optimal conditions be maintained in the sample container so that the various enzyme reactions described by equations (1)-(4) may occur simultaneously within the sample container with little to no cross-talk between them. The temperature of the chip 102 may be set to 37° C. using the PID controller, as this is the optimal temperature for cholesterol esters. In this case, silicone oil can be added to the test solution to prevent the solution from evaporating. The pH of the test solution may be controlled using a pH regulator (also known as a "buffer"). Cholesterol oxidase from Streptomyces spores is stable from pH 5 to 10 and optimum from pH 6.5 to 7. Hexokinase from Saccharomyces cerevisiae is optimal from pH 7.5 to 9, whilst peroxidase from horseradish is stable in the range of pH 5 to 9 and optimal from pH 6 to 6.5. The glucose-hexokinase reaction (equation (1)) decreases pH by a value of around 1. The inventors found that the best pH value for the pH regulator is 8, as this gives the best performance for all of the reactions. Triethanolamine hydrochloride, which is useful in the range of pH 7.3 to 8.3, was found to be a suitable pH regulator.

However, buffering capacity of the buffer solution (i.e. its ability to regulate pH, which depends on the concentration of the pH regulator) can affect the results of measurements made using the ISFET. If the buffering capacity is too high, a small pH variation can be screened such that the ISFET does not detect any change in pH. A concentration of 5 mM of Triethanolamine hydrochloride was found to be sufficient for maintaining the stability of the buffer without preventing the detection of small pH changes.

Ionic strength (i.e. the concentration of ions) not only plays an important role in enzyme reaction, but also affects the performance of the ISFET. A concentration of 50 mM of NaCl in the buffer solution was found to be adequate for both purposes.

A suitable buffer solution for producing reactions (1)-(4) in order to simultaneously detect and quantify glucose and cholesterol includes the following enzymes and chemicals: 46.9 µl of 5 mM triethanolamine HCl at pH 8; 1.7 µl of 15% w/w taurocholic acid solution; 1.7 µl of 15% w/w cholic acid solution; 5 µl of 60 U/ml peroxidase; 10 µl of 500 mM NaCl; 1.7 µl of 8.5 U/ml cholesterol esterase; 10 µl 100 mM of MgCl$_2$ solution, 10 µl of 100 mM ATP at pH 8.5; 4 µl of o-dianisidine; 1 µl of 0.1 U/µl hexokinase; and 3 µl of 10 U/ml cholesterol oxidase. Taurocholic acid solution and cholic acid solution are bile acids which act to activate cholesterol esterase and thereby facilitate absorption of cholesterol.

Prior to loading the sample container with the buffer solution, the sample container can be pre-treated by incubating the sample chamber with bovine serum albumin (BSA) in a triethanolamine HCl buffer (e.g. 5 mM triethanolamine and 50 mM NaCl). The incubation may last for 30 minutes and prevents molecules from attaching to the chip surface so as to minimise nonspecific binding. 10 µl of silicone oil may then be applied to the sample container in order to prevent the test solution from evaporating when it is heated. Following this pre-treatment of the sample container, the sample container is loaded with the buffer solution described above. In this manner, reactions (1)-(4) may be initiated when a sample of blood serum is inserted into the sample container.

In order to accurately determine the amount of metabolite in blood serum based on ISFET and photodiode measurements, the metabolite detection device may need to be calibrated. This can be carried out by measuring a series of samples containing known amounts of metabolite in order to establish a relationship between ISFET and/or photodiode voltage and metabolite concentration. As the voltage response of the ISFET and/or photodiode will be partially dependent on the buffer solution used (e.g. a buffer solution with a higher buffering capacity will reduce changes in pH, causing a lower ISFET voltage response), it is preferable to calibrate the metabolite detection device for a particular buffer solution. In other words, it is desirable for the buffer used in actual measurements is the same as the buffer used for calibration.

Another embodiment of the invention may be based on the structure shown in FIG. 5, but with the photodiode replaced by a single photon avalanche diode (SPAD). A SPAD is a semiconductor device based on a p-n junction reversed biased at a voltage higher than the breakdown voltage. It is able to detect low intensity signals (down to the single photon) and to signal the time of the photon arrival with high temporal resolution (few tens of picoseconds).

The response of both PD and SPAD to various light intensities was measured independently in order to determine the total dynamic range of the two detectors. By increasing the light source gradually, the SPAD was shown to be able to detect light when the power meter was measuring 21 µW/cm$^2$, and the maximum detection power was limited to 1.81 µW/cm$^2$ at which the SPAD started to saturate. Similarly, the PD detection dynamic range response was found to be from 280 nW/cm$^2$ to 41.1 µW/cm$^2$. The total resultant dynamic range of both sensors ranges from 19 µW/cm$^2$ to 41.1 µW/cm$^2$. The results show that the SPAD is capable of achieving much lower detection levels than the PD can achieve. The SPAD is therefore suitable for detection techniques that requires high sensitivity and low light illumination, whilst the PD is ideally suited for less sensitive detection techniques or techniques that requires high illumination as it will not be susceptible to saturation during experiment.

The present disclosure presents a CMOS-based ISFET and photodiode sensor used to detect and analyse metabolites simultaneously via pH and colour changes. An assay for simultaneous detection of risk factors for coronary heart disease (glucose and cholesterol) in human serum has been developed with pH and colorimetric readout. The assay can be performed using the CMOS-based device in one single well, unlike conventional approaches that require separate samples and different detection equipment. No obvious cross talking was observed, implying that this approach can be easily applied to detect other metabolites that produce pH or colour change during the enzyme reaction. Compared with current analytical methods for metabolite detection and quantification, no expensive detection equipment is required and the volume of the test sample is very small. An important advantage of this assay is that two metabolites were analysed simultaneously in one sensing window in real time. This provides useful information for monitoring and diagnostic purposes. This CMOS-based ISFET and photodiode device may thus be used as part of a rapid point of care diagnostic system, which can be used for bio-molecular sensing and for personal metabolite profiling. By providing an device that can be fabricated using standard CMOS processes, a single use disposable item that provides the multiple sensing modalities discussed above can be realized cost effectively.

The invention claimed is:

1. An apparatus for detecting metabolites in a biological sample, the apparatus comprising:
   a sample receiving module arranged to receive the biological sample;
   a test material provided within a reaction zone of the sample receiving module, the test material being configured to support a plurality of metabolite-activated reactions upon receiving the biological sample, wherein the sample receiving module is further configured to apply the biological sample to the test material, and wherein the test material has a plurality of properties that are affected by the presence of metabolites to be detected; and
   a CMOS-based sensor unit having multiple sensing modalities, the sensor unit comprising a substrate having a first sensing element and a second sensing element fabricated thereon,
   wherein the first sensing element and the second sensing element have different sensing modalities and are arranged to detect simultaneously respective different properties of the test material within a common volume of the reaction zone, wherein the different properties relate to different metabolite-activated reactions, thereby to enable simultaneous detection of a plurality of metabolites.

2. The apparatus according to claim 1, wherein the first sensing element comprises an optical sensor.

3. The apparatus according to claim 2 including an optical source for illuminating the test material with optical radiation.

4. The apparatus according to claim 2, wherein the optical sensor is a photodiode.

5. The apparatus according to claim 1, wherein the second sensing element is a chemical sensor.

6. The apparatus according to claim 1, wherein the second sensing element is a pH sensor.

7. The apparatus according to claim 1, wherein the second sensing element comprises an ion sensitive field effect transistor (ISFET) having a gate electrode in contact with the test material.

8. The apparatus according to claim 7 including a reference electrode arranged to apply a voltage to the test material.

9. The apparatus according to claim 1, wherein the test material is a liquid solution arranged to support a plurality of metabolite-activated reactions upon receiving the biological sample.

10. The apparatus according to claim 9, wherein the liquid solution comprises a plurality of enzymes in a buffer solution.

11. The apparatus according to claim 10, wherein the buffer solution includes a pH regulator for maintaining a pH of the liquid solution within a range in which the plurality of enzymes remain effective.

12. The apparatus according to claim 1 comprises an array of CMOS-based sensor units, wherein each CMOS-based sensor unit in the array comprises a respective first sensing element and a respective second sensing element.

13. The apparatus according to claim 12, wherein each CMOS-based sensor unit in the array is independently addressable to obtain signals from each respective first sensing element and respective second sensing element.

14. The apparatus according to claim 1 further comprising a temperature regulating module for controlling a temperature of the test material.

15. A method of detecting metabolites in a biological sample, the method comprising:
   applying, in a reaction zone of a detection apparatus, the biological sample to a test material that is configured to support a plurality of metabolite-activated reactions upon receiving the biological sample, wherein the test material has a plurality of properties that are affected by the presence of metabolites to be detected;
   simultaneously measuring different properties of the test material in a common volume of the reaction zone using a CMOS-based sensor unit having multiple sensing modalities, the sensor unit comprising a substrate having a first sensing element and a second sensing element fabricated thereon, wherein the first sensing element and the second sensing element have different sensing modalities that are arranged to detect different respective properties, which relate to different biomarker-activated reactions occurring in the reaction zone; and
   determining the presence of a plurality of metabolites based on output signals from the first sensing element and the second sensing element.

16. The method according to claim 15, wherein the first sensing element comprises an optical sensor, wherein the method includes illuminating the reaction zone with optical radiation, and wherein the output signal from the first sensing element is indicative of absorption of the optical radiation by the test material.

17. The method according to claim 15, wherein the second sensing element comprises a pH sensor, wherein the output signal from the second sensing element is indicative of a pH of the test material.

18. The method according to claim 15, wherein the first sensing element comprises an optical sensor, and wherein the method further comprises capturing an image or determining a change in optical properties of the test material.

* * * * *